Dec. 2, 1952

M. K. GORDON, JR., ET AL
ADJUSTABLE TORQUE AND DEFLECTION CONTROL
MECHANISM FOR INDICATING INSTRUMENTS
Filed July 5, 1950

2,619,933

INVENTORS
MALCOLM K. GORDON JR.
KURT E. LISCHICK

BY *[signature]*
ATTORNEY

Patented Dec. 2, 1952

2,619,933

UNITED STATES PATENT OFFICE 2,619,933

ADJUSTABLE TORQUE AND DEFLECTION CONTROL MECHANISM FOR INDICATING INSTRUMENTS

Malcolm K. Gordon, Jr., Garrison, N. Y., and Kurt E. Lischick, Cliffside Park, N. J., assignors to Bendix Aviation Corporation, Teterboro, N. J., a corporation of Delaware Application July 5, 1950, Serial No. 172,172

7 Claims. (Cl. 116—129)

1

This invention relates to indicating instruments and more particularly to mechanism for controlling the deflection and torque of an indicator staff.

In indicating instruments, such as tachometers or the like, wherein an eddy cup or disc is utilized for rotating the indicator hand or pointer over the face of a graduated dial, it is customary to employ a hairspring to impress a restraining torque on the indicator staff to calibrate the rate of rotation of the indicator hand with respect to the dial. Inasmuch as individual hairsprings vary in their characteristics, it is necessary to adjust the spring constant to accommodate the particular instrument with which it is to be used. This is accomplished by varying the position of a return path of a rotating magnet which results in a variation of the number of magnetic lines of force cutting across the eddy cup. In this manner, a predetermined torque may be impressed on the indicator staff with hairsprings having different spring constants. It is also the practice to set the indicator hand to a zero position until the hand registers with the zero mark of the dial. Frequently, difficulties arise because the convolutions of the springs tend to crowd together to create undue friction therebetween which results in variations of the original predetermined torque.

Another troublesome condition occurs when the sensitivity of the instrument is increased. In order to increase the sensitivity of the instrument, a pair of concentric rows of graduated indicia may be suitably impressed on the dial face or a second dial may be employed to tally the number of revolutions made by the indicator staff. For this reason, the physical dimensions of the springs must be changed to provide proper calibration. It is customary to attain this condition by increasing the diameter of the hairspring. However, in practice it has been found that when the diameter of the hairspring is made larger, the hairspring tends to sag in places to cause erratic operation thereof.

The present invention, therefore, contemplates a novel and improved mechanism for calibrating the indicator or pointer shaft of an instrument wherein a pair of spiral springs wound in opposite directions but in series aiding are connected to the shaft and adjustable means are provided for varying the tension of the springs as well as the zero position of the indicator hand.

An object of the present invention is to provide a novel mechanism wherein the number of revolutions of an indicator staff are increased by

2 utilizing a pair of spiral hairsprings in series to avoid the difficulties encountered with the use of a single spring.

Another object of the present invention is to provide a novel mechanism wherein the tension of a pair of spiral springs may be varied to adjust the torque strength thereof.

A still further object of the present invention is to provide a novel mechanism wherein a pair of spiral springs are maintained concentrically of an indicator staff whose rotation they yieldably oppose in a predetermined manner.

Still another object of the present invention is to provide a novel mechanism wherein a pair of spiral springs connected to an indicator staff may be adjusted to vary the zero position of a pointer mounted on the staff.

The above and other objects and advantages of the present invention will appear more fully hereinafter from a consideration of the detailed description which follows, taken together with the accompanying drawing wherein one embodiment of the invention is illustrated.

In the drawing wherein like reference characters refer to like parts in both views.

Figure 1:
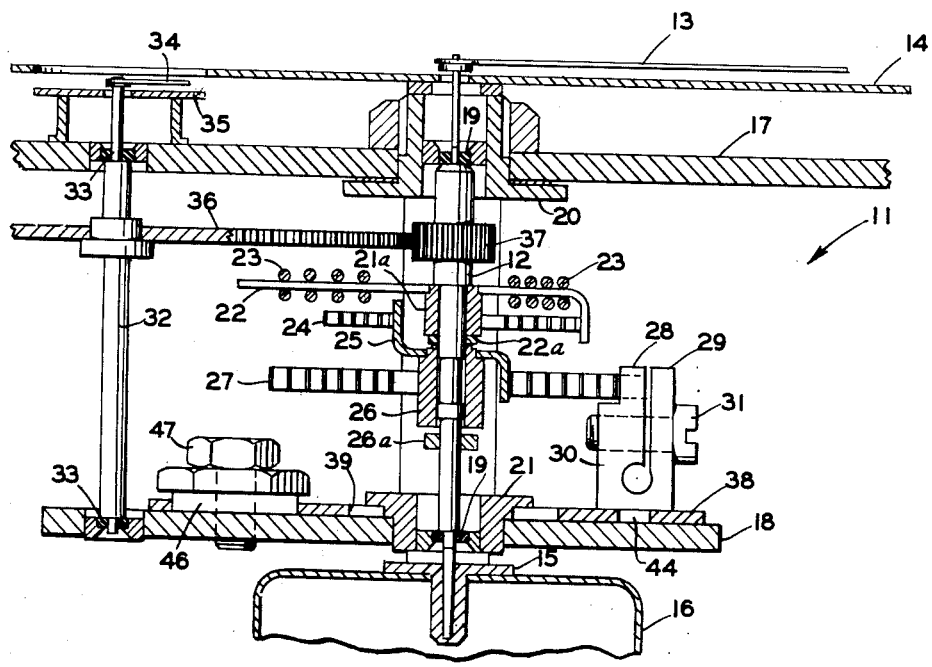
Figure 1 is an enlarged vertical sectional view of the novel mechanism.

Referring now to the drawing for a more detailed description of the present invention and more particularly to Figure 1 thereof, the novel mechanism hereof is shown as employed with a staff or indicator shaft 12, of an indicating instrument, the shaft having secured to one end thereof an indicating pointer or hand 13 coaxial with the face of an indicator dial 14. The dial 14 is of the ordinary type of dial commonly used in indicating instruments and for that reason only a side view thereof has been shown in Figure 1. Secured by fastening means 15 to the other end of staff 12 is a metallic cup 16 which serves as a drag member and is rotated by eddy currents induced by cutting the magnetic lines of force from a rotor (not shown), in a manner readily understood by those skilled in the art. Staff 12 is rotatably supported by a pair of circular bearing plates 17 and 18, the bearing plates being provided for that purpose with jewel bearings 19 which are carried by a pair of inserts 20 and 21, respectively, the inserts being mounted within openings formed in the plates for that purpose.

Secured to the upper portion of staff 12 is a balancer arm 22 having a weight 23, such as helical springs (shown in Figure 1), fastened thereto. The arm 22 is mounted on a hub 21a which is pressed onto staff 12 and has positioned immediately below the hub a washer 22a. Arm 22 has a curved portion to which is fastened by any suitable means, the outer end of a spiral hairspring 24 concentrically disposed about the staff. The inner end of hairspring 24 is fixed to one end of a cross arm 25 securely mounted on a collar 26 which is free to rotate on staff 12 and is positioned thereon by a washer 26a. A second hairspring 27 is spaced a predetermined distance below hairspring 24 and has its inner end soldered, or otherwise suitably fastened, to the other end of the cross arm 25. The outer end of spring 27, on the other hand, is held in a pair of adjustable jaws 28 and 29 of a clamp 30, the opening or closing of the jaws being accomplished by a thumb screw 31.

A second indicator staff 32 is rotatably supported in jewel bearings 33 in bearing plates 17 and 18 adjacent the staff 12. Staff 32 is provided with an indicator hand 34 which is coaxial with respect to a second indicating dial face or sub dial 35 immediately below a slot cut in dial 14. A gear segment 36 is fixed to the staff 32 and meshes with a pinion 37 mounted on staff 12. The gear ratio of gears 36 and 37 is so designed that for one complete revolution of the staff 12, staff 32 is angularly displaced a small angular distance. In this manner, the number of complete turns of the indicator hand 13 may be read off the sub dial 35 and the sensitivity of the instrument is increased so that small increments and decrements of measured force may be easily read off the larger dial 14.

Hairsprings 24 and 27 are wound in opposite directions in series aiding relation to exert a torque upon staff 12 against the rotative force transmitted thereto by drag cup 16. A pair of hairsprings are utilized to provide a greater number of turns of the staff 12 to overcome the disadvantage of using a single hairspring having a larger diameter with a greater number of convolutions. It is easily understood that a larger hairspring would present an unsuitable condition whereby the convolutions of the spring would tend to sag in places to cause erratic operation of the staff 12. For this reason, a pair of hairsprings additively connected are provided to effect an efficient manner of impressing a resistive torque to the rotation of the cup 16.

In calibrating the movement of the hand 13 with respect to the dial 14, a known torque is impressed on the staff 12 by adjusting the outer end of hairspring 27 in the clamp 30. Upon adjusting the torque strength of the springs 24 and 27, the position of hand 13 must be changed so as to coincide with a zero position on the dial face. To this end, there is provided a substantially circular plate 38 which is in sliding contact with the bearing plate 18 and disposed coaxially of staff 12 by means of an opening 39 in plate 38. The plate 38 has an elongated opening 40 therein to accommodate a clamping means consisting of a bolt 41 threadedly mounted in the bearing 18, the head of bolt 41 bearing against a clamp plate 42 which is in frictional contact with the circular plate 38. A finger or extension 43 is integrally formed with the plate 38 and serves upon manual actuation thereof to rotate plate 38 about a center point, such as staff 12. Thus, it may be seen that in order to adjust for the zero position of the hand 13 bolt 41 is rotated in a direction to loosen the clamp plate 42 from frictional contact with the plate 38. The finger 43 is then moved until the hand 13 is in alignment with the zero mark on the dial 14; this being effected through the movement of clamp 30 which is mounted on plate 38 by means of a pin 44 integrally formed with the clamp. Hairsprings 24 and 27 act together to rotate the staff 12 and consequently hand 13 to the zero or predetermined position.

Figure 2:
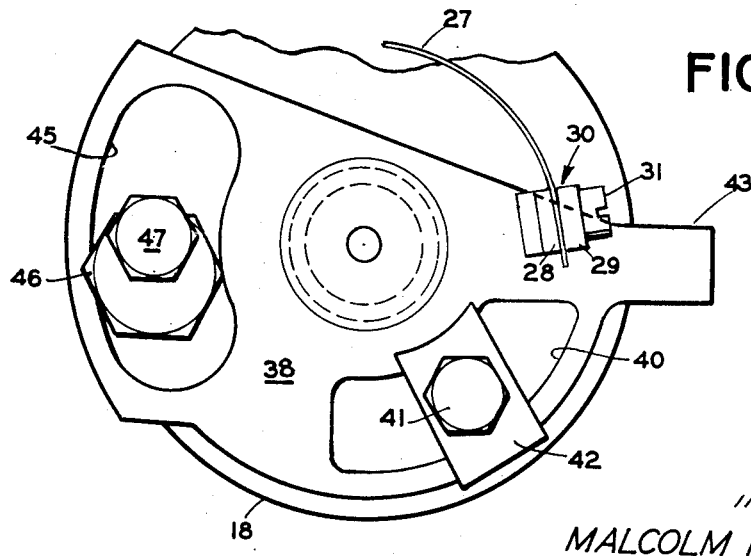
Figure 2 is a top plan view of the novel mechanism with the top plate and hairspring assembly removed.

Circular plate 38 has a third opening 45 (Fig. 2) formed therein to accommodate an eccentric 46 which contacts the walls of the opening. A bolt 47 is threadedly secured to bearing plate 18 and a portion of its shank passes through the eccentric 46 to bring the head of the bolt into contact with the hexagonal shaped head of the eccentric. It may be seen from the foregoing construction that when the bolt 47 is loosened, eccentric 46 may be rotated to slide the plate 38 in a direction normal to the staff 12 by virtue of its elongated opening 39. Eccentric 46 is provided to change the position of clamp 30 in order to vary the distances between the individual convolutions of each of the hairsprings 24 and 27. This is necessary because in practice it has been found that in adjusting the torque strength of the springs, the convolutions or turns thereof tend to twist or crowd together so that the hairsprings are not maintained concentrically of the staff. As a result, the convolutions are in frictional contact with each other and the predetermined adjusted torque strength is destroyed. Rotation of the eccentric 46 will correct this condition so as to line up the hairsprings to maintain them concentrically of the staff.

It is apparent that by the instant invention, a novel and improved mechanism has been provided which may be incorporated into indicating instruments such as tachometers or the like for adjusting the torque strength of a hairspring which exerts a resistive torque on an indicator hand, and embodies means for adjusting the zero position thereof together with means for maintaining the springs concentrically of the staff.

Although only one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art.

We claim:

1. Means for yieldably opposing the angular displacement of the pointer staff of an indicating instrument and for presetting the zero or rest position of the staff, comprising a pair of spaced spiral springs drivably connected to the staff, each of said springs being provided with two or more convolutions, means for adjustably holding the free end of one of said springs therein to thereby predetermine the amount of torque developed for opposing angular displacement of the staff, means for angularly displacing the holding means relative to the staff for presetting the zero position of the staff, and means for displacing the holding means in a direction normal to the staff for positioning the convolutions of each of said springs.

2. Means for yieldably opposing the angular displacement of the pointer staff of an indicating instrument and for presetting the zero or rest position of the staff, comprising a pair of spaced spiral springs drivably connected to the staff, each of said springs being provided with two or more convolutions, a pair of spaced bearing means supporting the staff, means for adjustably holding the free end of one of said springs therein mounted on one of said bearing means to thereby predetermine the amount of torque developed for opposing angular displacement of the staff and for calibrating the movement of the pointer staff, means for angularly displacing the holding means relative to the staff for presetting the zero position of the staff, and means positioned in one of said bearing means for displacing the holding means in a direction normal to the staff for positioning the convolutions of each of said springs.

3. Means for yieldably opposing the angular displacement of the pointer staff of an indicating instrument and for presetting the zero or reset position of the staff, comprising a pair of spiral springs drivably connected to the staff, each of said springs being provided with two or more convolutions, a pair of spaced bearing means supporting the staff, a clamp for adjustably holding the free end of one of said springs therein mounted on one of said bearing means to thereby predetermine the amount of torque developed for opposing angular displacement of the staff and for calibrating the movement of the pointer staff, means for angularly displacing the clamp relative to the staff for presetting the zero position of the staff, and adjustable means for displacing the clamp in a direction normal to the staff for positioning the convolutions of each of said springs.

4. Means for yieldably opposing the angular displacement of the pointer staff of an indicating instrument and for presetting the zero or rest position of the staff, comprising a pair of spiral springs drivably connected to the staff, each of said springs being provided with two or more convolutions, a pair of spaced bearing means supporting the staff, a plate positioned on one of said bearing means, said plate being slidable and rotatable thereon, means for adjustably holding the free end of one of said springs therein mounted in said plate to thereby predetermine the amount of torque developed for opposing angular displacement of the staff and for calibrating the movement of the pointer staff, means on said plate for angularly displacing the holding means relative to the staff for presetting the zero position of the staff, and eccentric means mounted on one of said bearing means and coacting with said plate for displacing the holding means in a direction normal to the staff for positioning the convolutions of each of said springs.

5. Means for yieldably opposing the angular displacement of the pointer staff of an indicating instrument and for presetting the zero or rest position of the staff, comprising a pair of spaced spiral springs drivably connected to the staff, each of said springs being provided with two or more convolutions, a pair of spaced bearing means supporting the staff, a rotatable and shiftable plate located thereon, a clamp for adjustably holding the free end of one of said springs therein mounted on one of said bearing members to thereby predetermine the amount of torque developed for opposing angular displacement of the staff and for calibrating the movement of the pointer staff, a member on said plate for rotating the plate to angularly displace the clamp relative to the staff for presetting the zero position of the staff, and an adjustable eccentric mounted on one of said bearing means and adapted to slide said plate to displace the clamp in a direction normal to the staff for positioning the convolutions of each of said springs.

6. A mechanism of the type described, comprising an angularly displaceable shaft, a hairspring drivably connected to the shaft at its inner end, means for holding the outer end of said spring fixed relative to said shaft, and means for displacing said holding means relative to said shaft for positioning the convolutions of said spring to maintain them concentrically of said shaft.

7. A mechanism of the type described, comprising an angularly displaceable shaft, a hairspring drivably connected to the shaft at its inner end, means for holding the outer end of said spring fixed relative to said shaft, a movable support including means for mounting said holding means thereon, and eccentric means for displacing said support and said holding means relative to said shaft, said eccentric means being adapted to provide for positioning of the convolutions of the spring so as to maintain them concentrically of said shaft.

MALCOLM K. GORDON, Jr.
KURT E. LISCHICK.

REFERENCES CITED

The following references are of record in the file of this patent:

UNITED STATES PATENTS

| Number | Name | Date |
|---|---|---|
| 1,114,362 | Huttenlocker | Oct. 20, 1914 |
| 1,661,214 | Carpenter | Mar. 6, 1928 |
| 2,413,414 | Obermaier | Dec. 31, 1946 |